United States Patent [19]

Pocachard et al.

[11] Patent Number: 5,475,310
[45] Date of Patent: Dec. 12, 1995

[54] INSTALLATION AND PROCESS FOR MEASURING REMANENT MAGNETIZATION OF GEOLOGICAL FORMATIONS

[75] Inventors: Jacques Pocachard, Voreppe; Véronique Barthes, St. Ismier, both of France

[73] Assignee: Commissariat A l'Energie Atomique, Paris, France

[21] Appl. No.: 276,546

[22] Filed: Jul. 18, 1994

[30] Foreign Application Priority Data

Jul. 30, 1993 [FR] France .................. 93 09428

[51] Int. Cl.⁶ ............................ G01V 3/26; G01V 3/40
[52] U.S. Cl. ................................... 324/346; 364/422
[58] Field of Search ........................... 324/345, 346

[56] References Cited

U.S. PATENT DOCUMENTS 3,965,413  6/1976  Yungul .
4,071,815  1/1978  Zemanek, Jr. .................. 324/346
5,075,625  12/1991  Augustin et al. .

FOREIGN PATENT DOCUMENTS 348049   5/1989   European Pat. Off. .
422985  10/1990   European Pat. Off. .
2158950  5/1985   United Kingdom .

Primary Examiner—Gerard R. Strecker
Attorney, Agent, or Firm—Pearne, Gordon, McCoy & Granger

[57] ABSTRACT

Probe and process for measuring the remanent field (R) of a geological formation. A measurement is made of the magnetic field (B+I1+R1) along the axis of the geomagnetic field using a scalar magnetometer, followed by a vector measurement of the resultant magnetic field (Bp+Ip+R3) projected onto an invariable measurement axis. With the aid of the calculated values of the geomagnetic field (B) and the magnetic susceptibility field (I), it is in particular possible to calculate a component (S) of the remanent magnetic field (R) perpendicular to the geomagnetic field (B) and determine if the cancellation of the component of the field (R1) along this axis is due to a tilting of the magnetic pole in history or a local reduction of the remanent magnetization.

8 Claims, 3 Drawing Sheets

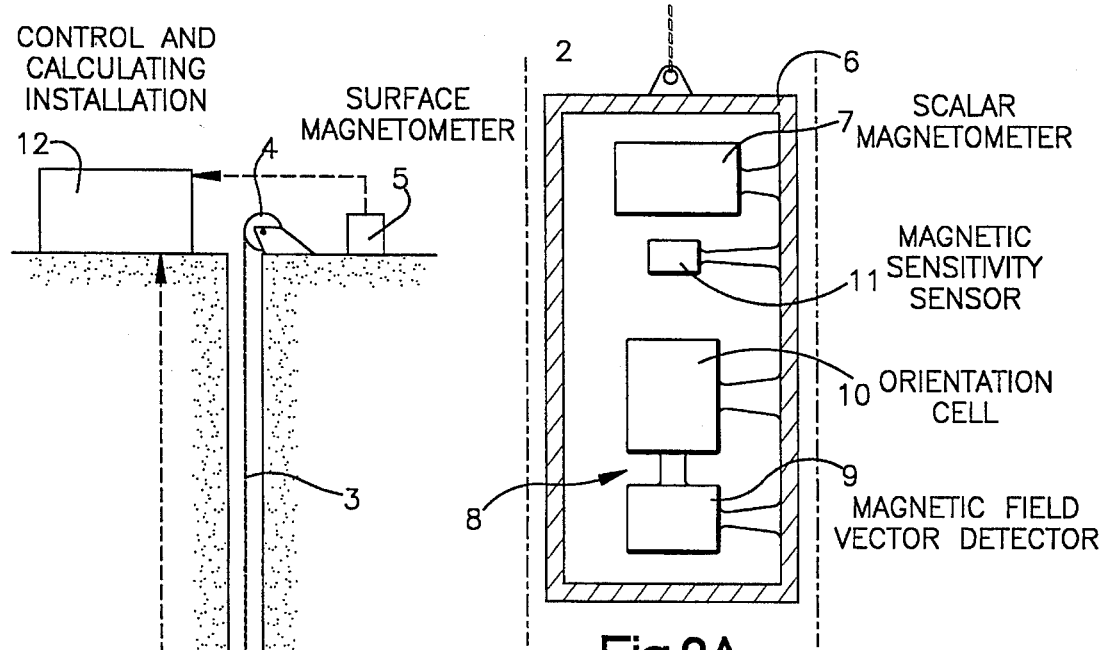
Fig.2A
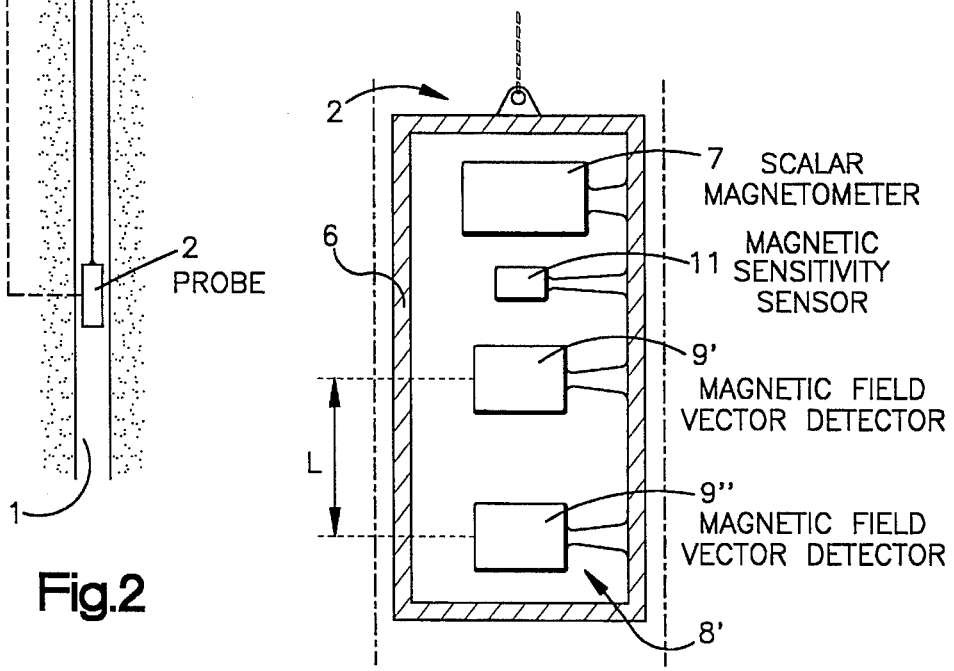
Fig.2
Fig.2B

1

INSTALLATION AND PROCESS FOR MEASURING REMANENT MAGNETIZATION OF GEOLOGICAL FORMATIONS

BACKGROUND OF THE INVENTION

The invention relates to an installation and to a process for calculating the remanent magnetization of a geological formation.

Remanent magnetization is a characteristic of geological formations and leads to a magnetic field, whose direction is dependent on the geographical position of the magnetic field at the time when said geological formation was formed. As this position has varied considerably in time, the detection of the direction of the remanent magnetization makes it possible to date geological formations. This process is of great interest for underground geological formations reached by drilling and boring operations and for which it is not easy to use other methods, which explains why remanent magnetization measurements are highly appreciated in connection with the prospecting for oil, which they make easier by supplying the age of the formations traversed.

Magnetic and electromagnetic sensors are used for measuring the magnetic field associated with the remanent magnetization. However, three magnetic fields are involved in the measurements, namely, apart from the remanent field, the field associated with the magnetic susceptibility of the rock, which is induced in the rock as a function of the local magnetic susceptibility and the geomagnetic field, due to remote magnetic influences and which preponderates.

Therefore the measurement probes are formed from several sensors, whose arrangement makes it possible to distinguish the effects of these three magnetic fields. Several systems, associated with different processes, have been proposed. In that which is closest to the present invention (illustrated in French patent 89 13199), use is made of a scalar magnetometer which measures the sum of the geomagnetic field and projections along the axis of said field of susceptibility and remanent magnetic fields. The geomagnetic field is measured separately by another scalar magnetometer, which can be positioned on the surface or at another point not far from the probe (because the time variations of the geomagnetic field scarcely vary with the distance) and a susceptibility sensor is used for separately measuring the magnetic susceptibility field.

The subtractions of the geomagnetic field and the projection of the magnetic susceptibility field from the result formed by the first scalar magnetometer makes it possible to obtain the projection of the remanent field along the axis of the geomagnetic field. Tilts of the position of the magnetic pole between the geographical north and south appear clearly when a diagraphic plot is made of the remanent magnetization along the bore-hole, because they correspond to cancelling out and changes of direction of the calculated projection of the remanent magnetization. As the dates of these tilts are known, it is possible to deduce the age of the formations passed through. However, serious practical difficulties can be encountered, because the cancelling out of projections can also result from a local reduction of the remanent magnetization, which is purely fortuitous being linked with the nature of the rock and it becomes all the more difficult to distinguish between these two causes as the measurement of the residual magnetization is subject to important uncertainties, because the intensity of the geomagnetic field preponderates (50,000 nanoteslas against about 10 or fewer nanoteslas).

It is clear that an analysis of the measurements where the number of tilts of the magnetic field is poorly evaluated would have little or no value for the dating of formations.

However, it is found that the measured remanent field is almost indistinguishable or illegible over 20% of the depth of the well.

The aim of the invention is to complete the prior art device by detecting by means of measurements and calculations another component of the remanent field, which can e.g. be perpendicular to the axis of the geomagnetic field. It is then possible to immediately establish if the cancelling out of the projection along the axis of the magnetic field is due to a tilt of the magnetic pole or to a reduction of the remanent magnetization.

SUMMARY OF THE INVENTION

In its most general form, the invention relates to an installation for the detection of a component of the remanent field, associated with a remanent magnetization of a geometrical formation also having a magnetic susceptibility associated with a magnetic susceptibility field, the geological formation being submerged in a geomagnetic field, the geomagnetic, remanent and susceptibility fields forming a total magnetic field when they are added in the direction of the geomagnetic field, the detected component of the remanent field being secant to the direction of the geomagnetic field, incorporating a scalar magnetometer measuring the total magnetic field, a means for measuring the geomagnetic field in intensity or direction, a means for measuring the magnetic susceptibility field in intensity and direction, and means for the digital combination of the measurements, said installation also incorporating a magnetometer measuring an algebraic sum of the geomagnetic, remanent and susceptibility fields projected in a measurement direction differing from the geomagnetic field direction.

The second magnetometer, which can be of a monoaxial or vector type, can be constituted by a vector detector and a cell for positioning or measuring the vector detector in orientation, or two coupled vector detectors for performing differential measurements.

The invention also relates to a process for the detection of a component of the remanent field, associated with a remanent magnetization, of a geological formation also having a magnetic susceptibility associated with a magnetic susceptibility field, the geological formation being submerged in a geomagnetic field, the geomagnetic, remanent and susceptibility fields forming a total magnetic field when they are added in the direction of the geomagnetic field, the detected component of the remanent field being secant to the direction of the geomagnetic field, consisting of measuring the total magnetic field, obtaining in direction and intensity the geomagnetic field and the magnetic susceptibility field, characterized in that it consists of measuring an algebraic sum of the geomagnetic, remanent and susceptibility fields projected in a measurement direction differing from the direction of the geomagnetic field, obtaining the angle between the measurement direction and the direction of the total magnetic field, calculating the components of the geomagnetic field and the magnetic susceptibility field in the measuring direction and then the component of the remanent magnetic field in the measurement direction.

It is then possible to calculate the component of the remanent magnetic field in the measurement direction or in the direction of the geomagnetic field in order to finally calculate a vector component of the remanent field perpendicular to the direction of the geomagnetic field.

BRIEF DESCRIPTION OF THE DRAWINGS

The invention will now be described in greater detail with respect to non-limitative embodiments and the attached drawings, wherein show:

FIG. 2 A diagrammatic illustration of the measuring device.

FIGS. 2A and 2B In greater detail the measuring probe.

DETAILED DESCRIPTION OF PREFERRED EMBODIMENTS

Figure 1:
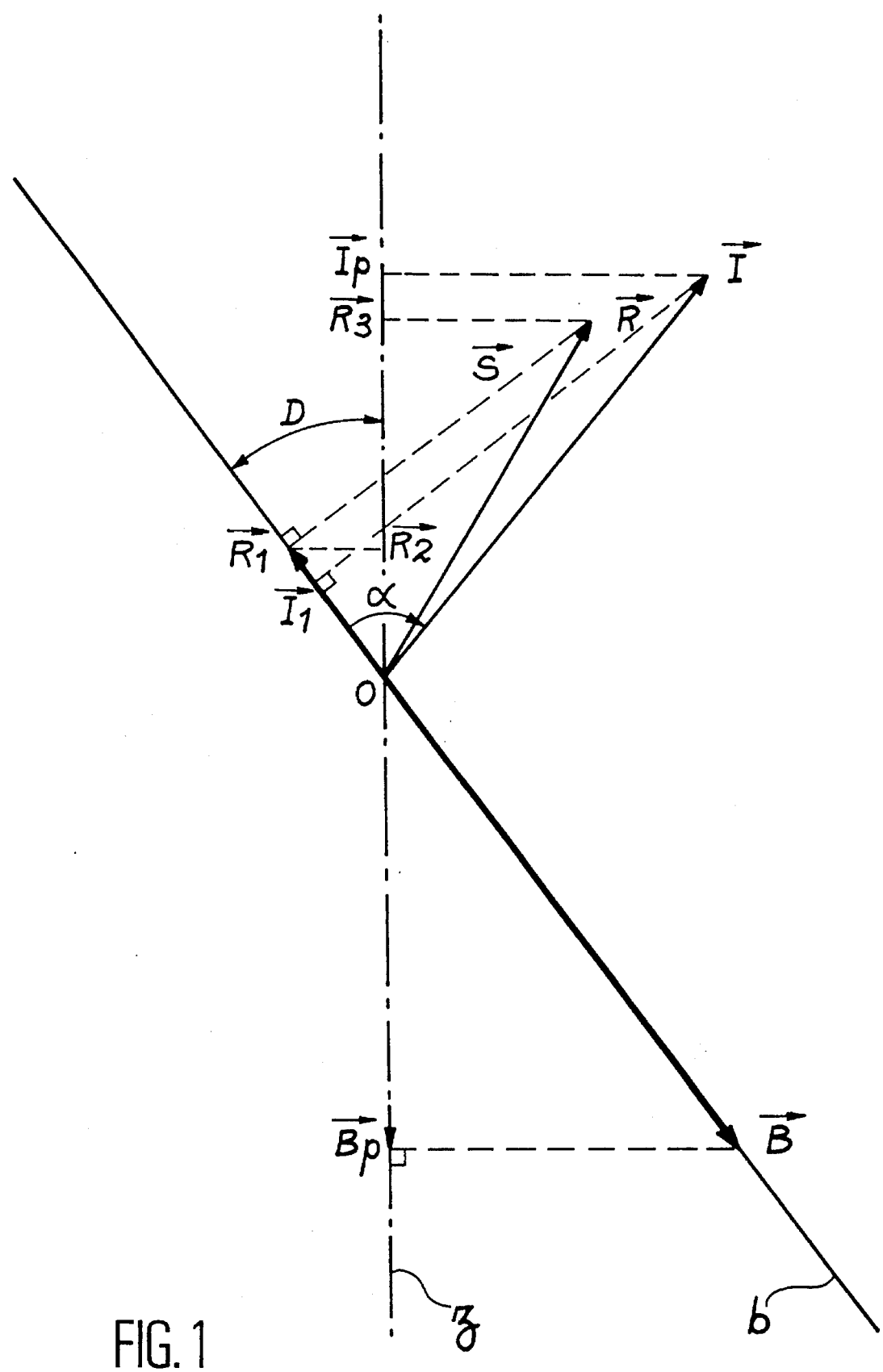
FIG. 1 The magnetic fields used and the notations employed in this description.

The device according to the invention is more particularly used (FIG. 2) for measurements in a drill or bore-hole 1 at a depth of a few hundred meters or a few kilometers. Its essential element is a probe 2 suspended on a cable 3 dependent on an unwinding installation 4 positioned on the ground. In the same way as a surface magnetometer 5, the probe 2 is connected to a control and calculating installation 12 by not shown electric wires.

The surface magnetometer 5 is used for the surface measurement of the geomagnetic field. It can be located close to the opening of the bore-hole or at a certain distance therefrom, which can be in practice up to 100 kilometers.

The actual probe is constituted by a body 6 attached to the cable 3 and which contains, according to FIG. 2A, a scalar magnetometer 7, a monoaxial magnetometer 8 and a magnetic susceptibility sensor 11. The scalar magnetometer 7 and the susceptibility sensor 11 are rigidly connected to the body 6, but the monoaxial magnetometer 8 comprises a magnetic field vector detector 9, whose orientation must either be maintained constant no matter what the angular position variations of the probe 2, or, and this is the case used under the specific measurement conditions in the bore-hole 1, measured by an orientation cell under the same conditions. This orientation cell 10 is incorporated into the probe 2.

The scalar magnetometer 7 and the susceptibility sensor 11 once again occur in the slightly different embodiment of FIG. 2B, but the monoaxial magnetometer 8' is constituted by two vector detectors 9' and 9" rigidly connected to the body 6 and placed with identical measurement directions and an accurately known spacing L. They make it possible to perform gradient measurements.

These different measuring or detection means are only diagrammatically shown because they do not form part of the invention, being known and illustrated in numerous publications. Thus, reference is in particular made to U.S. Pat. Nos. 2,524,360, 2,664,542, 2,716,730, 3,317,821, 3,369,174, 3,402,348, 3,965,412, 3,965,413 and 4,071,815, as well as French patent 2 564 601, which all describe magnetic measuring probes in bore-holes and where it is often wished to measure the remanent magnetization by different methods. The scalar magnetometers can have nuclear magnetic resonance or optical pumping, whereas the vector detectors or magnetometers of the flux discriminators can be resonance (e.g. EPR) or optical pumping detectors.

Reference should now be made to FIG. 1. The scalar magnetometer 7 measures a magnetic field, which can be expressed by an algebraic sum of the magnetic field B (oriented in accordance with an oblique axis b), of the projection I1 of the magnetic susceptibility field I on said axis b and the projection R1 of the remanent magnetic field R on said same axis b. The magnetic susceptibility field I forms an angle $\propto$ with the axis b and the remanent magnetic field R is equal to the vector sum of its components R1 and S, the latter being perpendicular to the axis b. The monoaxial magnetometer 8 directly measures the algebraic sum of the projections of the three magnetic fields B, I and R along the measurement axis Z, which can in practice be vertical in the same way as the bore-hole 1, or whereof the orientation is measured by the cell 10—said three projections being designated Bp, Ip and R3.

The monoaxial magnetometer 8' performs a differential measurement and therefore functions like a vector gradientmeter, which supplies the variations of Ip and R3 in accordance with the measurement direction. It is merely necessary to integrate its signal in order to again obtain the algebraic sum (Bp+Ip+R3).

The following stage of the process consists of calculating the angle D formed by the axes b and z. This angle D is equal to arc cos $[(Bp+Ip+R3)/(B+I1+R1)]$ and can therefore be calculated immediately on the basis of the measurements or read on geomagnetic maps, which also supply the direction of the axis b.

The scalar surface magnetometer 5 makes it possible to separately measure the intensity of the geomagnetic field B, whose direction is also known, and the susceptibility sensor 11 measures the intensity and direction of the magnetic susceptibility field I, which supplies the angle $\propto$ once the direction of the axis b is known. From it is deduced the projection I1 and then the projection R1 by subtraction where R1=(B+R1+I1)-B-I1.

The knowledge of the angle D and the direction of the magnetic susceptibility field I makes it possible to calculate the projections Ip and Bp on the axis z. From it is deduced the projection R3 by subtraction where R3=(Bp+Ip+R3)-Bp-Ip, and finally the sought component S by S=(R3-Rl cos D)/sin D.

Figure 3:
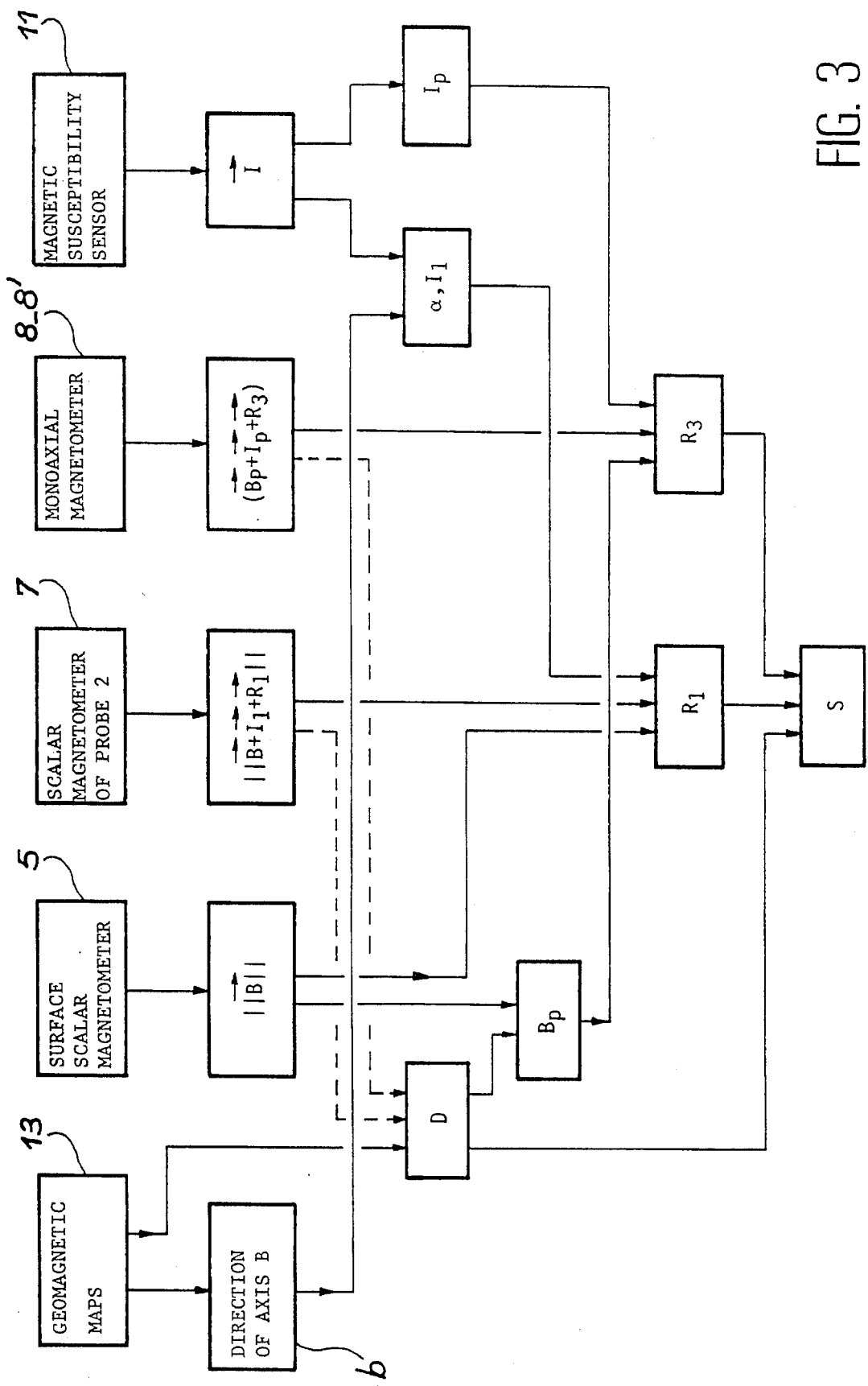
FIG. 3 A flow chart summarizing the process.

The flow chart of FIG. 3 summarizes the analysis of these calculations, which are performed in the control and calculation installation 12 to which are also supplied the geomagnetic data read on the maps (designated 13). When the evolution curve of the component S with the depth is known, it is juxtaposed with the evolution curve of the component R1 so that it is possible to count in error-free manner the traces of the tilts of the magnetic pole and more accurately deduce the age of the formations as a function of the depth. In practice, the measurements are performed at five centimeter intervals.

The different measuring means can be placed in separate probes, which are successively lowered into the bore-hole 1.

We claim:

1. Installation for detecting a component (S) of a remanent field (R), associated with a remanent magnetization, of a geological formation also having a magnetic susceptibility associated with a magnetic susceptibility field (I), the geological formation being submerged in a geomagnetic field (B), the geomagnetic, remanent and susceptibility fields forming a total magnetic field in a direction of the geomagnetic field, the detected component (S) of the remanent field (R) being secant to the direction of the geomagnetic field, said installation comprising a scalar magnetometer (7), located at a measurement site in the geological formation, for measuring the total magnetic field in the direction of the geomagnetic field, means, located at a surface site generally above the geological formation, for measuring the geomagnetic field (B) in intensity and direction at the geological formation, means, located at the measurement site in the geological formation, for measuring the magnetic susceptibility field (I) in intensity and direction, a second magnetometer (8, 8'), located at the measurement site in the geological formation, for measuring an algebraic sum of the geomagnetic, remanent and susceptibility fields projected in a measurement direction differing from the direction of the geomagnetic field, and means, in communication with the scalar magnetometer, the geomagnetic field measuring means, the magnetic susceptibility field measuring means, and the second magnetometer, for calculating the component (S) of the remanent field as a function of the total magnetic field in the direction of the geomagnetic field, the intensity and direction of the geomagnetic field, the intensity and direction of the magnetic susceptibility field, and the algebraic sum of the geomagnetic, remanent and susceptibility fields projected in the measurement direction.

2. Detection installation according to claim 1, wherein said second magnetometer (8) includes a vector detector (9) and a cell (10) for maintaining the orientation of the vector detector.

3. Detection installation according to claim 1, wherein said second magnetometer (8) includes a vector detector (9) and a cell for measuring the orientation of the vector detector.

4. Detection installation according to claim 1, wherein said second magnetometer is formed from two coupled vector detectors (9, 9") for performing differential measurements.

5. Process for detecting a remanent field (R), associated with a remanent magnetization, of a geological formation also having a magnetic susceptibility associated with a magnetic susceptibility field (I), the geological formation being submerged in a geomagnetic field (B), the geomagnetic, remanent and susceptibility fields forming a total magnetic field in a direction of the geomagnetic field, said process comprising the steps of measuring the total magnetic field in the direction of the geomagnetic field at a measurement site in the geological formation, obtaining in direction and intensity the geomagnetic field (B) and the magnetic susceptibility field (I), measuring an algebraic sum of the geomagnetic, remanent and susceptibility fields at the measurement site in the geological formation in a measurement direction differing from the direction of the geomagnetic field, obtaining an angle between the measurement direction and the total magnetic field direction, calculating components (Bp, Ip) of the geomagnetic field and the magnetic susceptibility field along the measurement direction as a function of the angle between the measurement direction and the total magnetic field direction, the intensity of the geomagnetic field, and the direction and intensity of the magnetic susceptibility field, and calculating a component (R3) of the remanent magnetic field (R) along the measurement direction as a function of the algebraic sum of the geomagnetic, remanent and susceptibility fields in the measurement direction, and the components of the geomagnetic field and the magnetic susceptibility field along the measurement direction.

6. Detection process according to claim 5, further comprising the step of calculating a component (R1) of the remanent magnetic field (R) in the geomagnetic field direction as a function of the total magnetic field in the direction of the geomagnetic field, the direction and intensity of the geomagnetic field, and the direction and intensity of the magnetic susceptibility field.

7. Detection process according to claim 6, further comprising the step of calculating a component (S) of the remanent magnetic field perpendicular to the direction of the geomagnetic field as a function of the components (R1 and R3) of the remanent magnetic field in the measurement direction and in the geomagnetic field direction and the angle (D) between said components.

8. Detection process according to claim 5, wherein said measurement direction is an axis of a hole (1) drilled in the geological formation.

* * * * *